US012063647B2

(12) United States Patent
Zhou et al.

(10) Patent No.: US 12,063,647 B2
(45) Date of Patent: Aug. 13, 2024

(54) POWER EFFICIENT MONITORING FOR SEMI-PERSISTENT SCHEDULING OCCASIONS ON MULTIPLE COMPONENT CARRIERS

(71) Applicant: QUALCOMM Incorporated, San Diego, CA (US)

(72) Inventors: Yan Zhou, San Diego, CA (US); Tao Luo, San Diego, CA (US); Konstantinos Dimou, San Francisco, CA (US); Juan Montojo, San Diego, CA (US); Xiaoxia Zhang, San Diego, CA (US); Mostafa Khoshnevisan, San Diego, CA (US); Seyed Ali Akbar Fakoorian, San Diego, CA (US); Hamed Pezeshki, San Diego, CA (US)

( * ) Notice: Subject to any disclaimer, the term of this patent is extended or adjusted under 35 U.S.C. 154(b) by 149 days.

(21) Appl. No.: 16/947,079

(22) Filed: Jul. 17, 2020

(65) Prior Publication Data

US 2021/0022162 A1 Jan. 21, 2021

Related U.S. Application Data

(60) Provisional application No. 62/876,305, filed on Jul. 19, 2019.

(51) Int. Cl.
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
None
See application file for complete search history.

(56) References Cited

U.S. PATENT DOCUMENTS 8,605,674 B2 12/2013 Park et al.
2010/0232373 A1 9/2010 Nory et al.
2011/0002281 A1* 1/2011 Terry .................... H04W 76/28 370/329
2012/0155316 A1* 6/2012 Li ......................... H04W 72/23 370/252
2012/0195265 A1* 8/2012 Kim ...................... H04L 1/1861 370/328

(Continued)

FOREIGN PATENT DOCUMENTS

CN 103098407 A * 5/2013 ........... H04L 1/1861
WO WO-2012070831 A2 5/2012

(Continued)

OTHER PUBLICATIONS

International Search Report and Written Opinion—PCT/US2020/042730—ISA/EPO—Oct. 29, 2020.

(Continued)

*Primary Examiner* — Kenny S Lin
*Assistant Examiner* — Rodrick Mak

(57) ABSTRACT

Various aspects of the present disclosure generally relate to wireless communication. In some aspects, a user equipment (UE) may determine, in a current cycle, information related to downlink transmission duplication on multiple component carriers, wherein each of the multiple component carriers is associated with a semi-persistent scheduling (SPS) configuration. The UE may monitor a subset of the multiple component carriers for a scheduled SPS occasion in one or more of the current cycle or a next cycle based at least in part on the information related to the downlink transmission duplication on the multiple component carriers in the current cycle. Numerous other aspects are provided.

30 Claims, 14 Drawing Sheets

1300

1310 Determine, in a current cycle, information related to downlink transmission duplication on multiple component carriers, wherein each of the multiple component carriers is associated with a semi-persistent scheduling (SPS) configuration 1320 Monitor a subset of the multiple component carriers for a scheduled SPS occasion in one or more of the current cycle or a next cycle based at least in part on the information related to the downlink transmission duplication on the multiple component carriers in the current cycle

(56) References Cited

U.S. PATENT DOCUMENTS

| | | | | |
|---|---|---|---|---|
| 2015/0263842 | A1* | 9/2015 | Nakao | H04J 3/16 370/336 |
| 2018/0048433 | A1* | 2/2018 | Martin | H04L 1/1893 |
| 2020/0029379 | A1* | 1/2020 | Xiao | H04W 76/27 |
| 2020/0119864 | A1* | 4/2020 | Xu | H04W 28/06 |
| 2020/0221271 | A1* | 7/2020 | Kim | H04W 4/40 |
| 2020/0396760 | A1* | 12/2020 | Yi | H04L 1/1864 |
| 2022/0015172 | A1* | 1/2022 | Xu | H04L 5/0053 |
| 2023/0397170 | A1* | 12/2023 | Li | H04L 1/189 |

FOREIGN PATENT DOCUMENTS

| | | | | |
|---|---|---|---|---|
| WO | WO-2018174664 | A1 * | 9/2018 | H04L 1/1607 |
| WO | WO-2019027308 | A1 * | 2/2019 | H04L 1/0047 |

OTHER PUBLICATIONS

Vivo: "Methods on Triggering Adaptation of UE Power Consumption Characteristics", 3GPP Draft, 3GPP TSG RAN WG1 Ad-Hoc Meeting 1901, R1-1900146, Methods on Triggering Adaptation of UE Power Consumption Characteristics, 3rd Generation Partnership Project (3GPP), Mobile Competence Centre, 650, Route Des Lucioles, F-06921, vol. RAN WG1. No. Taipei, Jan. 21, 2018-Jan. 25, 2018, Jan. 12, 2019 (Jan. 12, 2019), XP051575768, 6 pages, Retrieved from the Internet: URL: http://www.3gpp.org/ftp/tsg%5Fran/WG1%5FRL1/TSGR1%5FAH/NR%5FAH%5F1901/Docs/R1%2D1900146%2Ezip. [retrieved on Jan. 12, 2019] chapter 3—HARQ-ACK/NACK based triggering chapter 5—proposal 2.

* cited by examiner

POWER EFFICIENT MONITORING FOR SEMI-PERSISTENT SCHEDULING OCCASIONS ON MULTIPLE COMPONENT CARRIERS

CROSS-REFERENCE TO RELATED APPLICATION

This Patent Application claims priority to U.S. Provisional Patent Application No. 62/876,305, filed on Jul. 19, 2019, entitled "POWER EFFICIENT MONITORING FOR SEMI-PERSISTENT SCHEDULING OCCASIONS ON MULTIPLE COMPONENT CARRIERS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for power efficient monitoring for semi-persistent scheduling occasions on multiple component carriers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include: determining, in a current cycle, information related to downlink transmission duplication on multiple component carriers, wherein each of the multiple component carriers is associated with a semi-persistent scheduling (SPS) configuration; and monitoring a subset of the multiple component carriers for a scheduled SPS occasion in one or more of the current cycle or a next cycle based at least in part on the information related to the downlink transmission duplication on the multiple component carriers in the current cycle.

In some aspects, a UE for wireless communication may include a memory and one or more processors operatively coupled to the memory. The memory and the one or more processors may be configured to: determine, in a current cycle, information related to downlink transmission duplication on multiple component carriers, wherein each of the multiple component carriers is associated with an SPS configuration; and monitor a subset of the multiple component carriers for a scheduled SPS occasion in one or more of the current cycle or a next cycle based at least in part on the information related to the downlink transmission duplication on the multiple component carriers in the current cycle.

In some aspects, a non-transitory computer-readable medium may store one or more instructions for wireless communication. The one or more instructions, when executed by one or more processors of a UE, may cause the one or more processors to: determine, in a current cycle, information related to downlink transmission duplication on multiple component carriers, wherein each of the multiple component carriers is associated with an SPS configuration; and monitor a subset of the multiple component carriers for a scheduled SPS occasion in one or more of the current cycle or a next cycle based at least in part on the information related to the downlink transmission duplication on the multiple component carriers in the current cycle.

In some aspects, an apparatus for wireless communication may include: means for determining, in a current cycle, information related to downlink transmission duplication on multiple component carriers, wherein each of the multiple component carriers is associated with an SPS configuration; and means for monitoring a subset of the multiple component carriers for a scheduled SPS occasion in one or more of the current cycle or a next cycle based at least in part on the information related to the downlink transmission duplication on the multiple component carriers in the current cycle.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
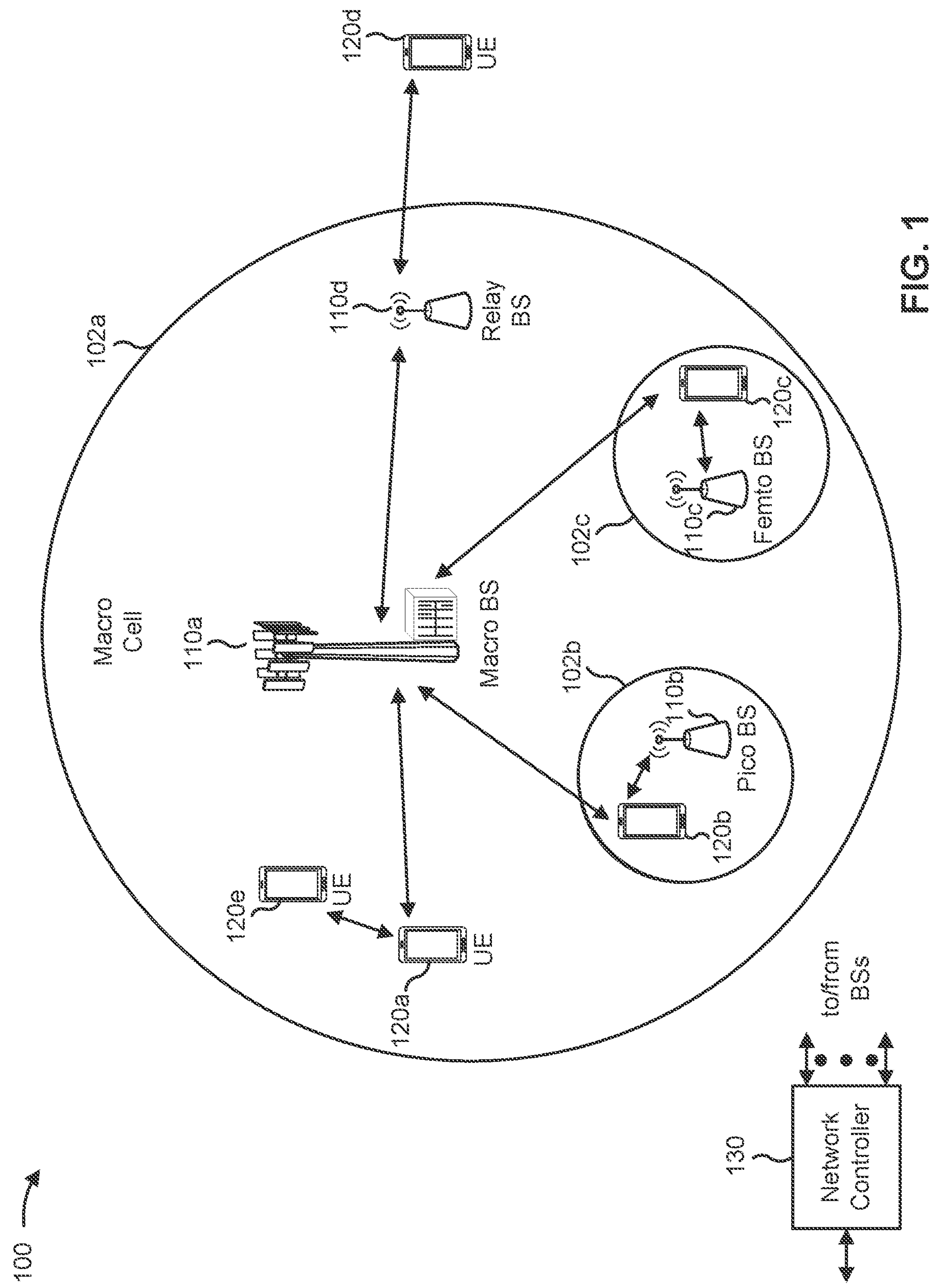
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms “eNB”, “base station”, “NR BS”, “gNB”, “TRP”, “AP”, “node B”, “5G NB”, and “cell” may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a “sub-6 GHz” band. Similarly, FR2 is often referred to as a “millimeter wave” band despite being different from the extremely high frequency (EHF) band (30 GHz-300 GHz) which is identified by the International Telecommunications Union (ITU) as a “millimeter wave” band. Thus, unless specifically stated otherwise, it should be understood that the term “sub-6 GHz” or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term “millimeter wave” or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
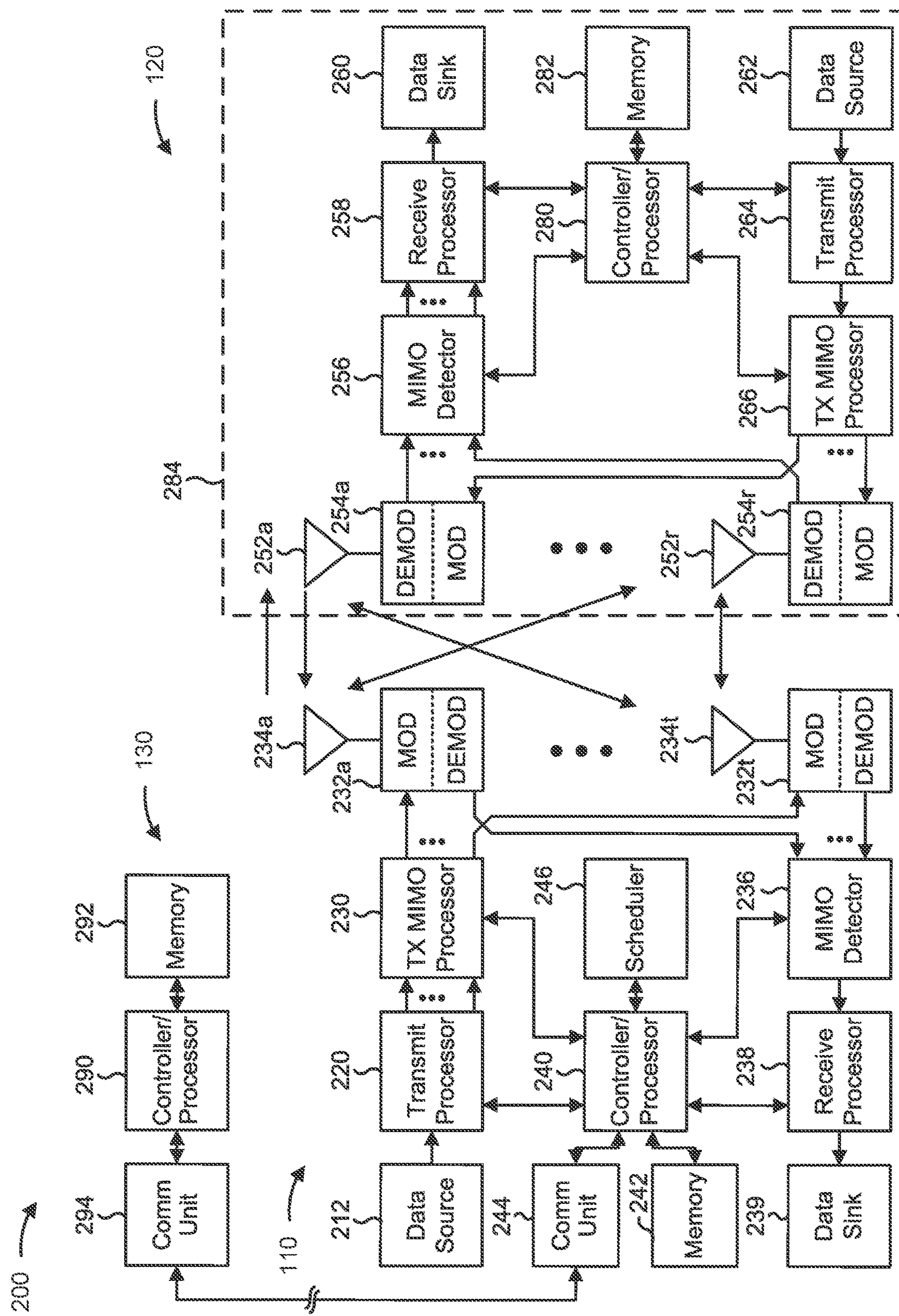
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8A-8B, FIG. 9, FIG. 10, FIG. 11, FIG. 12, and/or FIG. 13.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8A-8B, FIG. 9, FIG. 10, FIG. 11, FIG. 12, and/or FIG. 13.

Controller/processor 240 of base station 110, controller/processor 280 of UE 120, and/or any other component(s) of FIG. 2 may perform one or more techniques associated with power efficient monitoring for semi-persistent scheduling (SPS) occasions on multiple component carriers, as described in more detail elsewhere herein. For example, controller/processor 240 of base station 110, controller/processor 280 of UE 120, and/or any other component(s) of FIG. 2 may perform or direct operations of, for example, process 1300 of FIG. 13 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1300 of FIG. 13 and/or other processes as described herein. In some aspects, executing instructions may include running the instructions, converting the instructions, compiling the instructions, interpreting the instructions, and/or the like.

In some aspects, UE 120 may include means for determining, in a current cycle, information related to downlink transmission duplication on multiple component carriers, wherein each of the multiple component carriers is associated with an SPS configuration, means for monitoring a subset of the multiple component carriers for a scheduled SPS occasion in one or more of the current cycle or a next cycle based at least in part on the information related to the downlink transmission duplication on the multiple component carriers in the current cycle, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3:
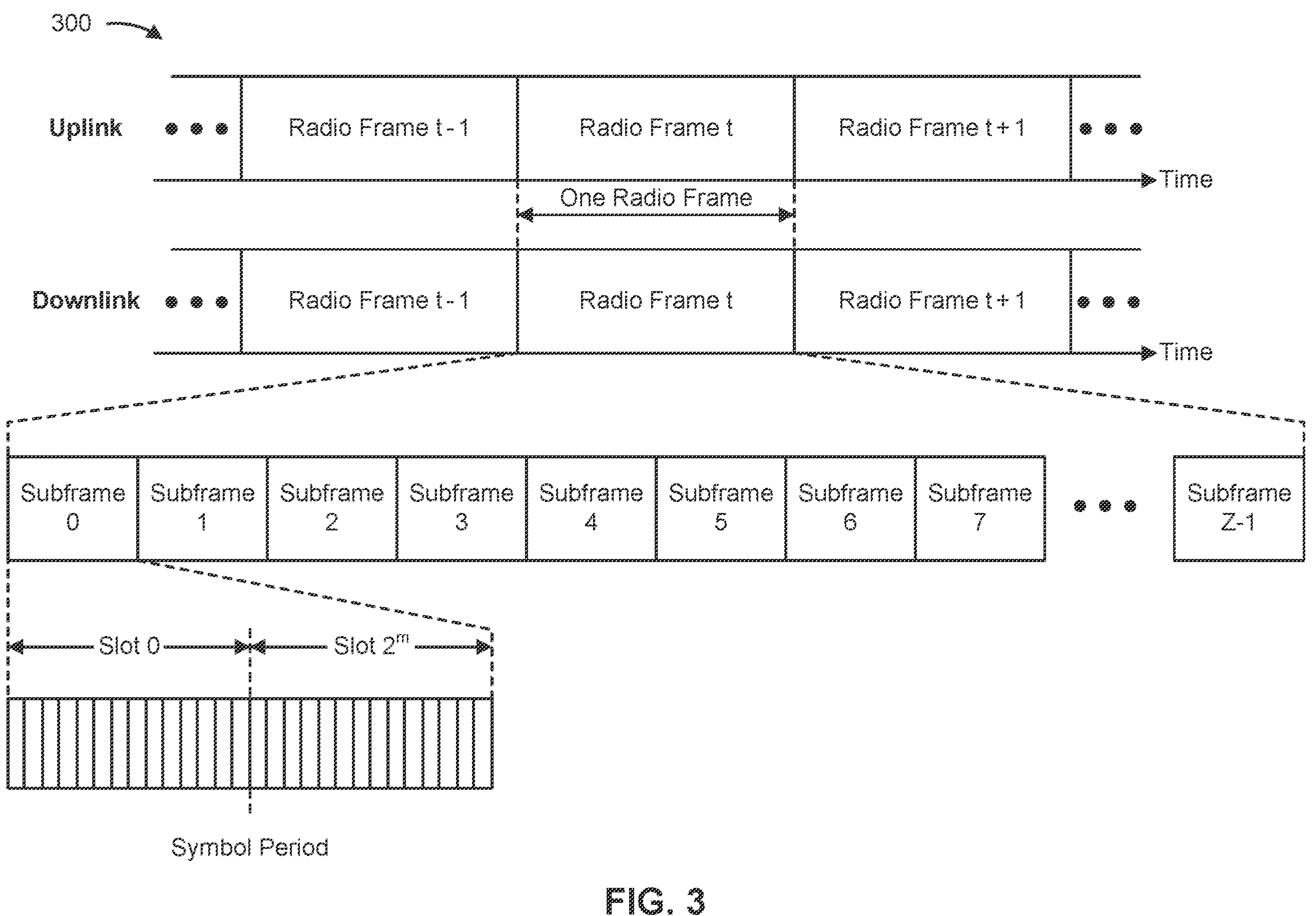
FIG. 3 is a diagram illustrating an example frame structure in a wireless communication network, in accordance with various aspects of the present disclosure.

FIG. 3 shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs. In some aspects, the base station may transmit the PSS, the SSS, and/or the PBCH in a synchronization signal block (SSB).

As indicated above, FIG. 3 is provided as an example. Other examples may differ from what is described with regard to FIG. 3.

Figure 4:
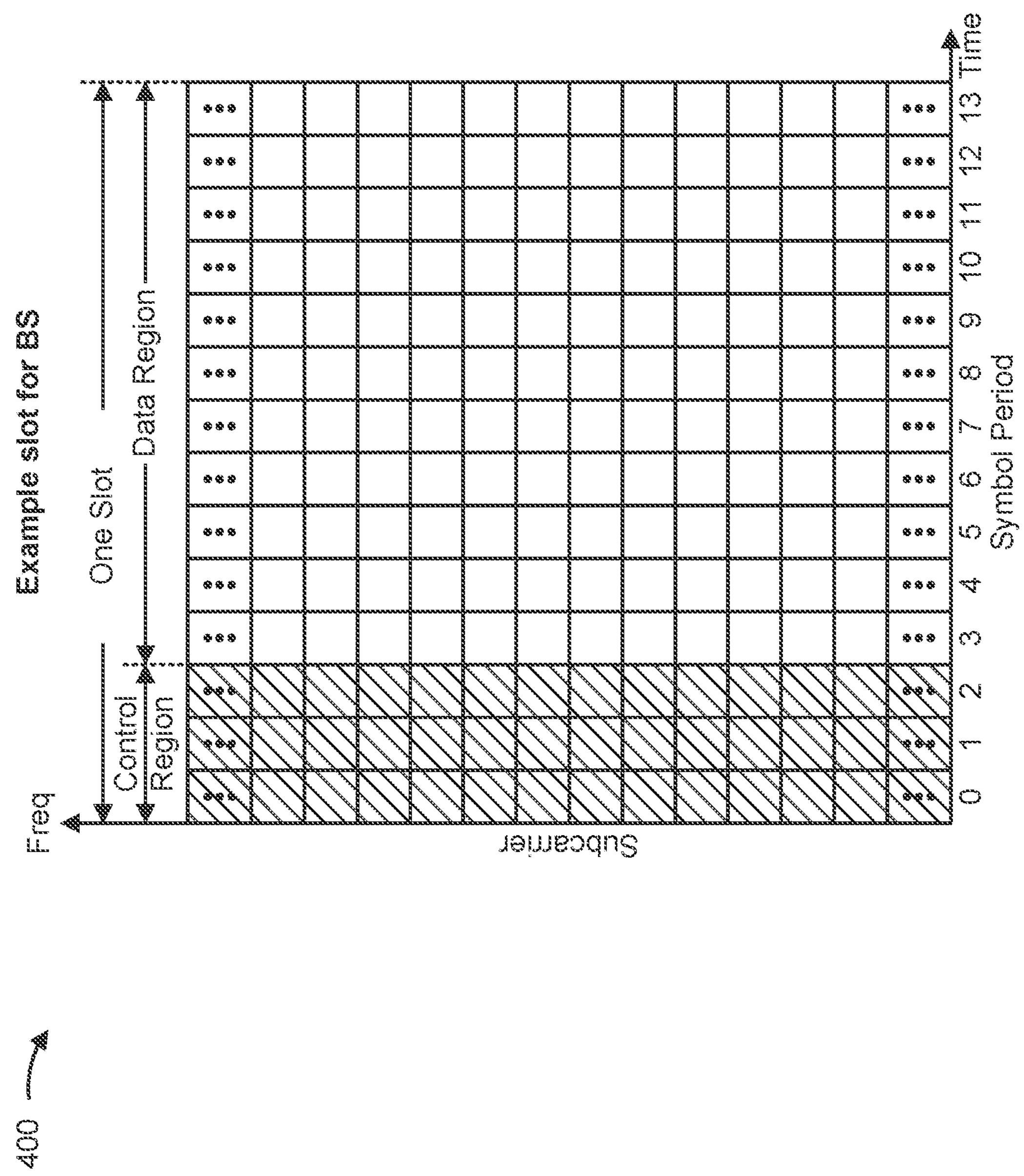
FIG. 4 is a diagram illustrating an example slot format with a normal cyclic prefix, in accordance with various aspects of the present disclosure.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, and/or the like, where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), a reference signal received power (RSRP), a log likelihood ratio (LLR), a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. "New Radio" (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In some aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
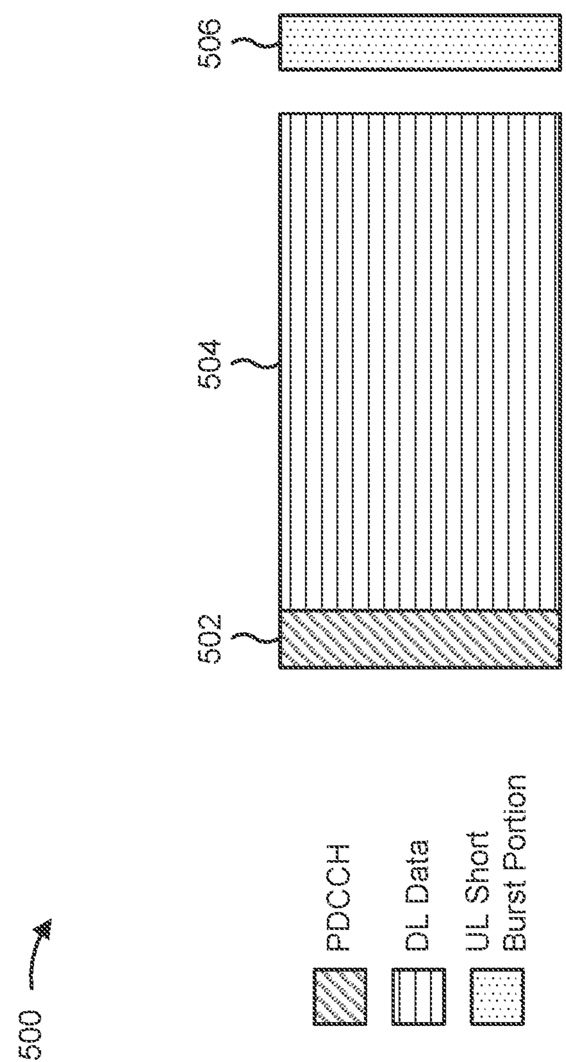
FIG. 5 is a diagram illustrating an example of a downlink (DL)-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PD SCH).

The DL-centric slot may also include an uplink (UL) short burst portion 506. The UL short burst portion 506 may sometimes be referred to as an uplink burst, an uplink burst portion, a common uplink burst, a short burst, an uplink short burst, a common uplink short burst, a common uplink short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the DL data portion 504. Non-limiting examples of information that may be included in the UL short burst portion 506 include an ACK signal (e.g., a physical UL control channel (PUCCH) ACK, a physical UL shared channel (PUSCH) ACK, an immediate ACK), a NACK signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 5 is provided as an example. Other examples may differ from what is described with regard to FIG. 5.

Figure 6:
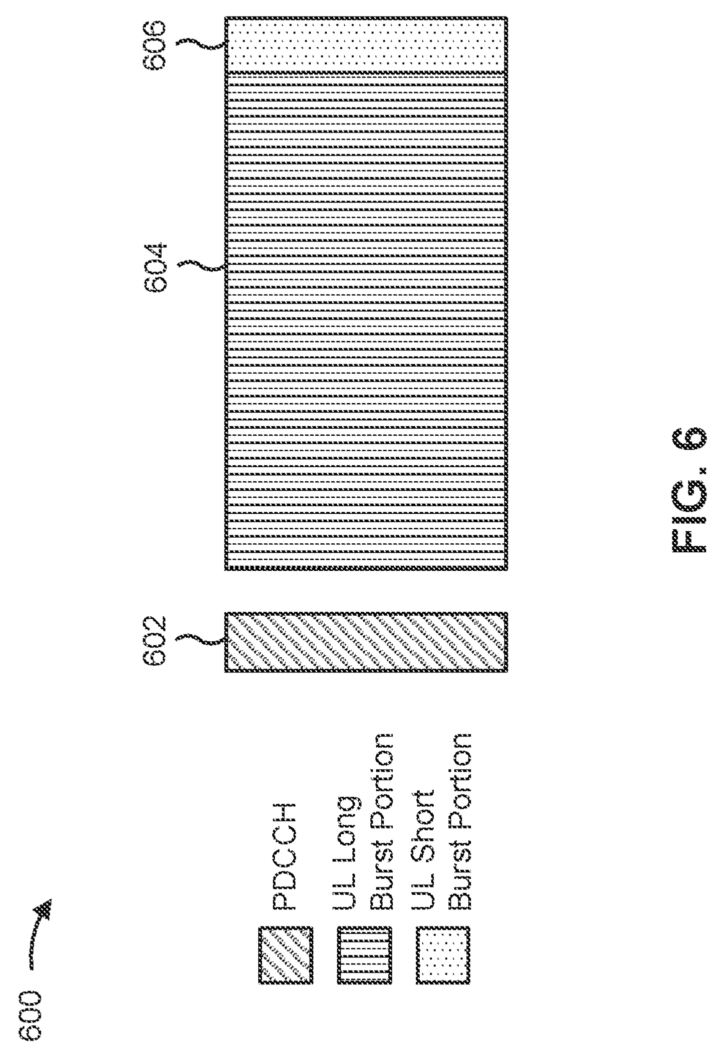
FIG. 6 is a diagram illustrating an example of an uplink (UL)-centric slot, in accordance with various aspects of the present disclosure.

FIG. 6 is a diagram 600 showing an example of an uplink-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an uplink long burst portion 604. The UL long burst portion 604 may sometimes be referred to as the payload of the UL-centric slot. The communication resources utilized to communicate UL data from the subordinate entity (e.g., UE) to the scheduling entity (e.g., UE or BS) may be referred to as the UL portion. In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an uplink (UL) short burst portion 606. The UL short burst portion 606 in FIG. 6 may be similar to the UL short burst portion 506 described above with reference to FIG. 5, and may include any of the information described above in connection with FIG. 5. The foregoing is one example of an uplink-centric wireless communication structure, and alternative structures having similar features may exist without necessarily deviating from the aspects described herein.

As indicated above, FIG. 6 is provided as an example. Other examples may differ from what is described with regard to FIG. 6.

Figure 7:
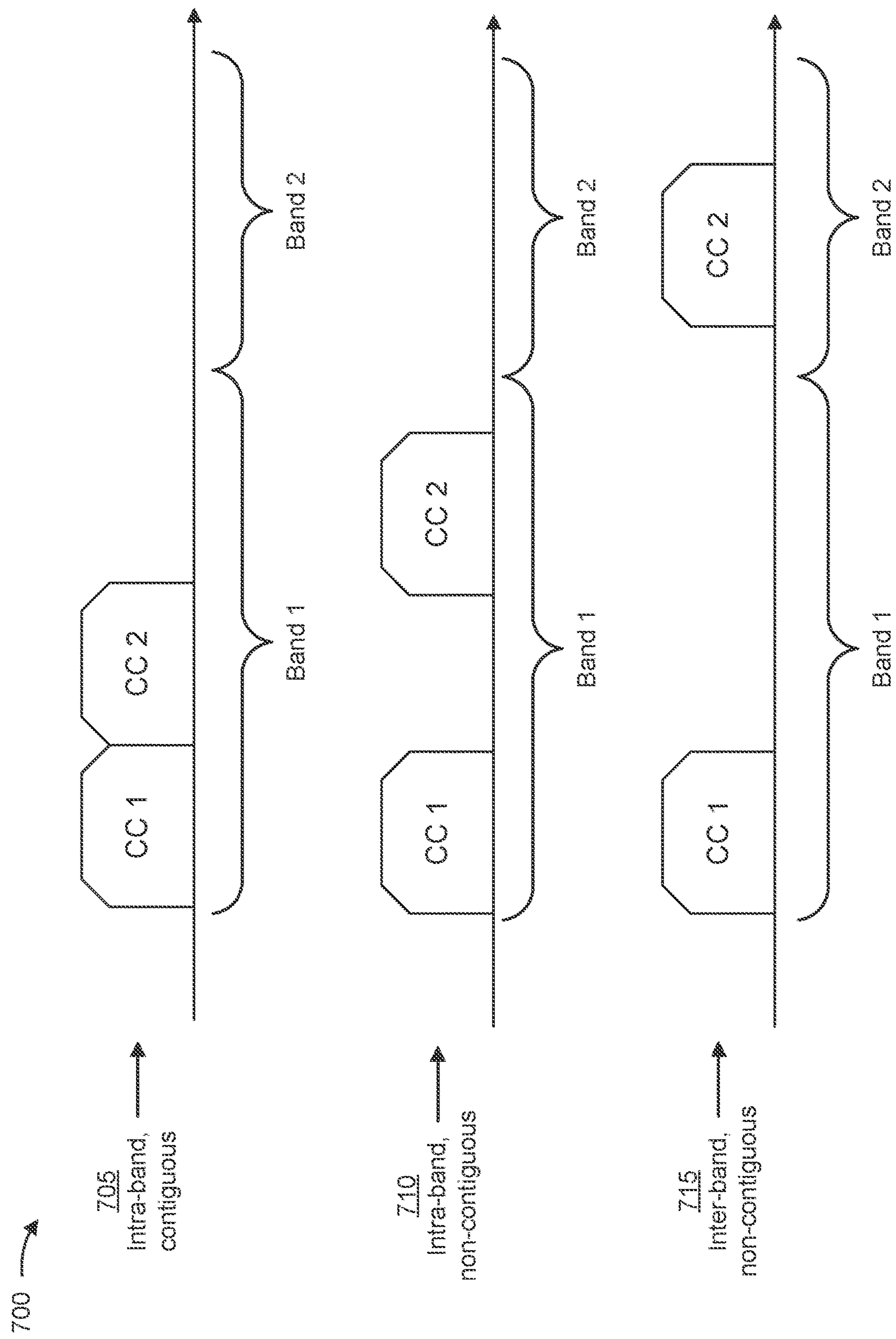
FIG. 7 is a diagram illustrating examples of carrier aggregation, in accordance with various aspects of the present disclosure.

FIG. 7 is a diagram illustrating examples 700 of carrier aggregation, in accordance with various aspects of the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands, the same or different frequency ranges, and/or the like. Additionally, or alternatively, contiguous or non-contiguous carriers can be combined. A base station 110 may configure carrier aggregation for a UE 120, such as in a radio resource control (RRC) message, downlink control information (DCI), and/or the like.

As shown by reference number 705, in some aspects, carrier aggregation may be configured in an intra-band contiguous mode where the aggregated carriers are contiguous to one another and are in the same frequency band. As shown by reference number 710, in some aspects, carrier aggregation may be configured in an intra-band non-contiguous mode where the aggregated carriers are non-contiguous to one another and are in the same frequency band. As shown by reference number 715, in some aspects, carrier aggregation may be configured in an inter-band non-contiguous mode where the aggregated carriers are non-contiguous to one another and are in different frequency bands.

As indicated above, FIG. 7 is provided as an example. Other examples may differ from what is described with regard to FIG. 7.

Figure 8A:
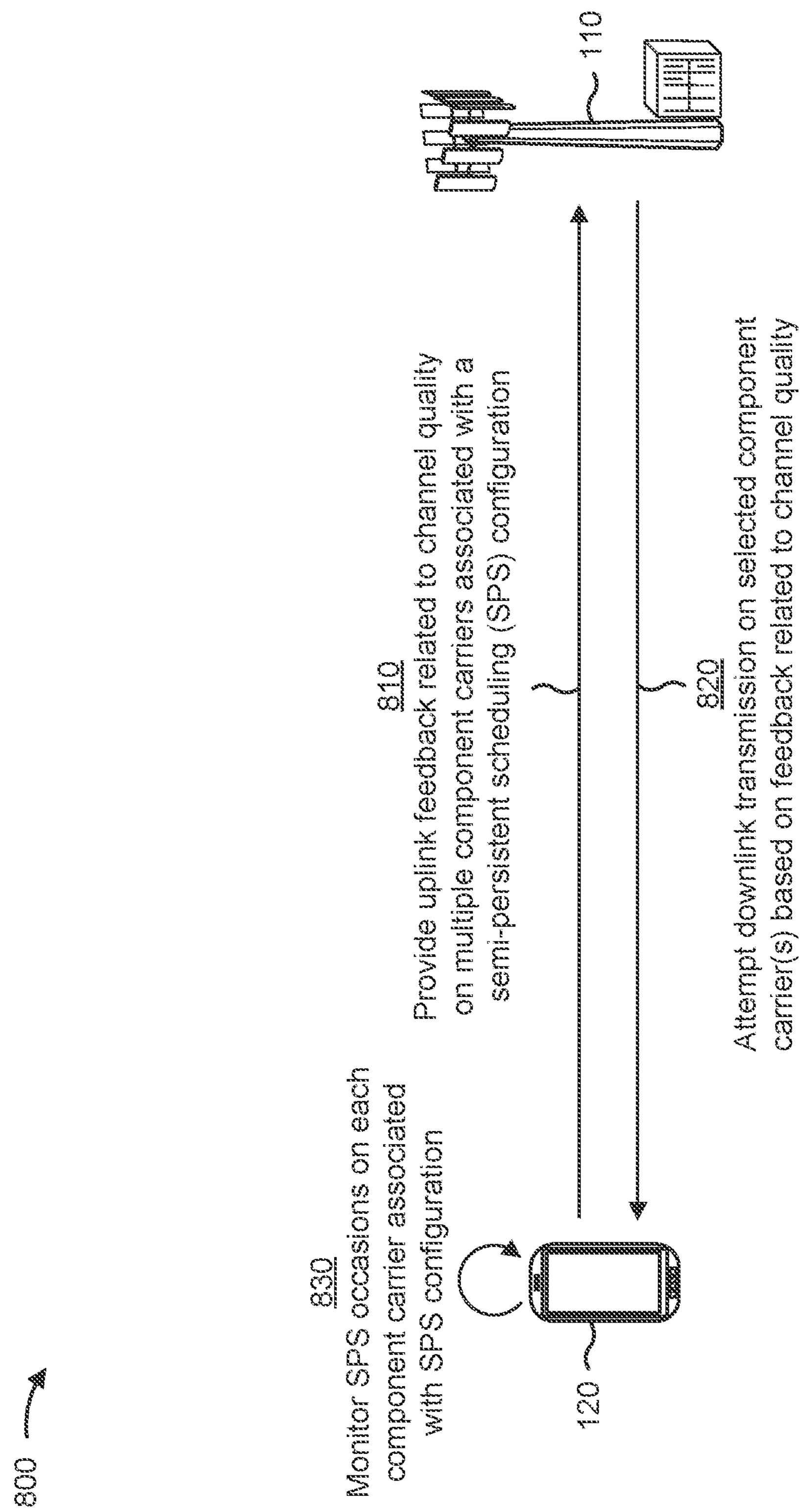
FIGS. 8A-8B are diagrams illustrating an example of monitoring semi-persistent scheduling (SPS) occasions on multiple component carriers, in accordance with various aspects of the present disclosure.
Figure 8B:
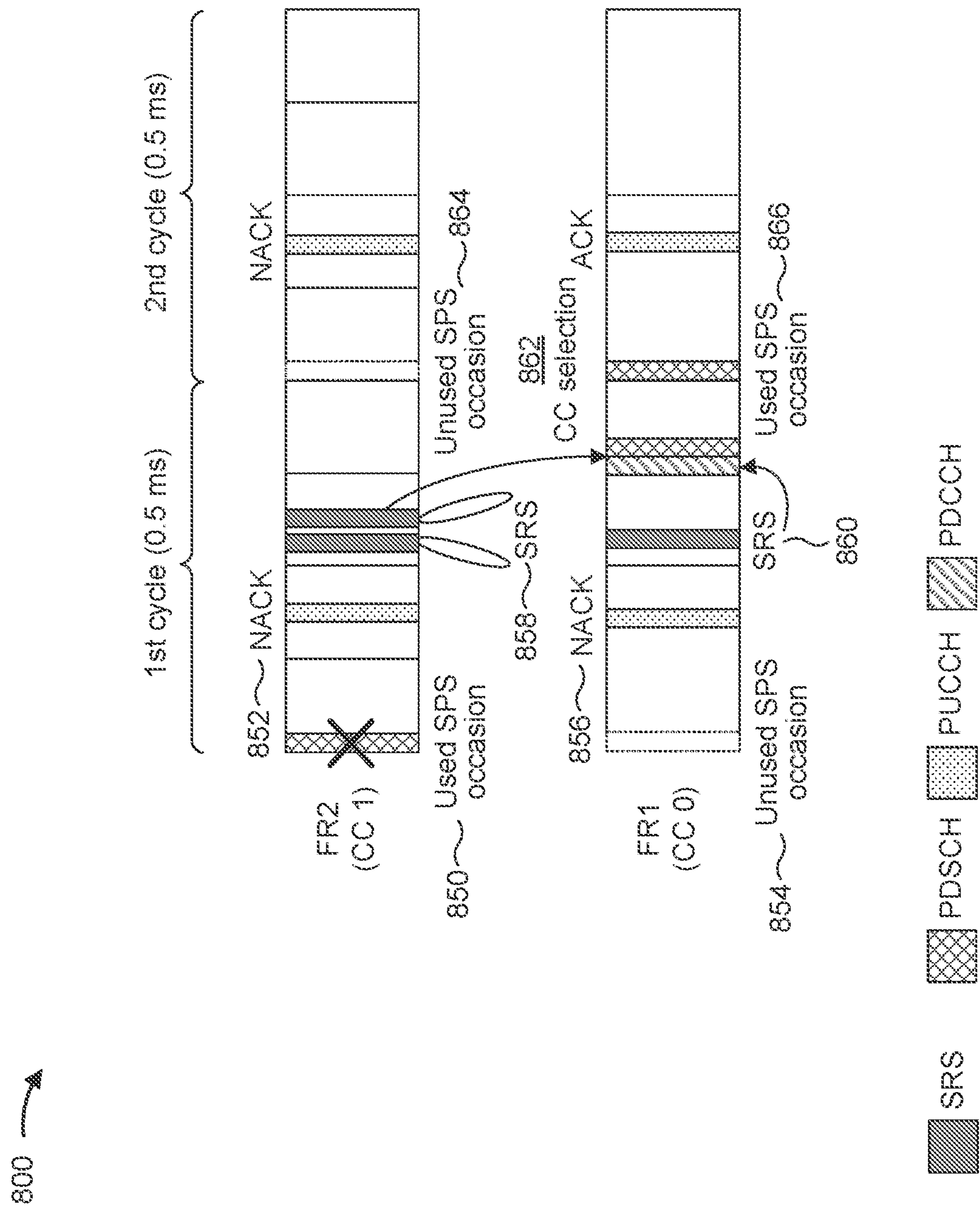

FIGS. 8A-8B are diagrams illustrating an example 800 of monitoring semi-persistent scheduling (SPS) occasions on multiple component carriers, in accordance with various aspects of the present disclosure.

SPS generally enables radio resources to be semi-statically configured and allocated to a UE for a longer time period than one subframe, which may avoid the need for specific downlink assignment messages over a physical downlink control channel (PDCCH) for each subframe. To configure SPS, radio resource control (RRC) signaling may indicate an interval at which the radio resources are periodically assigned. PDCCH signaling may indicate specific transmission resource allocations in a time/frequency domain and further indicate one or more transmission attributes (e.g., periodicity, modulation and control scheme (MCS), time offset, transmit power, and/or the like). For uplink SPS, non-adaptive synchronous hybrid automatic repeat request (HARQ) is performed. For example, non-adaptive retransmissions may be performed on a same resource and with a same MCS as was used for a last (e.g., previous) transmission. For downlink SPS, adaptive asynchronous HARQ is performed. For example, adaptive retransmissions may be performed on a resource and, if provided, with the MCS indicated on the PDCCH.

In carrier aggregation, a UE 120 and a base station 110 may communicate via multiple carriers that may have different frequencies, which may be contiguous within a particular frequency band, non-contiguous within a particular frequency band, non-contiguous across different frequency bands within a particular frequency range, non-contiguous across different frequency bands within different frequency ranges, and/or the like. For example, in NR, frequency bands may be separated into different frequency ranges, which may include Frequency Range 1 (FR1) that includes frequency bands below 6 gigahertz (GHz) (also known as sub-6 GHz) and Frequency Range 2 (FR2) that includes millimeter wave (mmW) frequency bands. In general, carrier aggregation features can enable increased bandwidth, increased throughput, increased reliability, and/or the like for communications between the UE 120 and the base station 110 (e.g., using cross-carrier retransmissions across different carriers). For example, although mmW frequencies in FR2 offer higher bandwidth than frequencies in FR1, radio waves in mmW frequencies have very short wavelengths, from one to ten millimeters. Accordingly, transmissions in FR2 are sensitive to blockage and atmospheric attenuation, which tends to limit propagation to a few kilometers or less (e.g., line-of-sight). As a result, in some cases, a downlink transmission (e.g., of a transmission block (TB), a protocol data unit (PDU), and/or the like) from the base station 110 to the UE 120 in FR2 may fail to reach the UE 120, may degrade in quality while in transit to the UE 120, and/or the like.

Accordingly, in some cases, SPS can be configured on multiple component carriers, which may be in the same frequency band, different frequency bands, the same frequency range, different frequency ranges, and/or the like, and the base station 110 may dynamically select a set of one or more component carriers to be used to duplicate a downlink transmission for increased robustness. Additionally, or alternatively, the base station 110 may select one or more component carriers to be used to reschedule a failed downlink transmission (e.g., where a downlink transmission in FR2 fails to reach the UE 120 due to atmospheric absorption, blocking caused by reliability issues, and/or the like). In general, the base station 110 may select the one or more component carriers to be used for duplicating a downlink transmission and/or rescheduling a failed downlink transmission based on one or more parameters that relate to channel quality on the multiple component carriers (e.g., SINR, RSRP, LLR, and/or the like), which can be determined based on a NACK indicating that a scheduled transmission failed, based on an uplink sounding reference signal (SRS), based on an uplink report that the UE 120 provides in response to a Channel State Information Reference Signal (CSI-RS) transmitted from the base station 110 to the UE 120, and/or the like.

In particular, as shown in FIG. 8A, and by reference number 810, a UE 120 may transmit, and a base station 110 may receive, uplink feedback related to channel quality on multiple component carriers that are associated with an SPS configuration. In some aspects, the uplink feedback may be a NACK following an SPS occasion in which the UE 120 did not detect or otherwise receive a PDSCH transmission (e.g., due to a failed downlink transmission attempted by the base station 110 during the SPS occasion, an unused SPS occasion that the base station 110 may have reassigned to another UE 120, and/or the like). For example, where the NACK follows an SPS occasion in which the base station 110 attempted a PDSCH transmission on a particular component carrier, the base station 110 may infer that channel quality on that particular component carrier has degraded. Additionally, or alternatively, the UE 120 may provide one or more measurements related to channel quality on the component carrier together with the NACK. In some aspects, the uplink feedback may include an uplink SRS transmission that the base station 110 can use to estimate channel quality on the corresponding component carrier, an uplink report based on a CSI-RS transmission received at the UE 120, and/or the like. As described in further detail herein, upon transmitting the NACK to indicate a failure to detect, decode, or otherwise successfully receive a scheduled PDSCH transmission, the UE 120 may start to monitor one or more other component carriers in which the base station 110 may eventually retransmit the PDSCH transmission.

As further shown in FIG. 8A, and by reference number 820, the base station 110 may attempt a downlink transmission (and/or retransmission) on one or more component carriers that are selected based on the uplink feedback provided by the UE 120. As further shown in FIG. 8A, and by reference number 830, the UE 120 may monitor and decode SPS occasions on each component carrier associated with an SPS configuration. In particular, the UE 120 may be unaware of which SPS occasion(s) the base station 110 is using to duplicate a downlink transmission, and may therefore monitor and decode SPS occasions on all component carriers with SPS configured. However, in some cases, the base station 110 may only select or otherwise use a subset of the component carriers to duplicate a downlink transmission (e.g., because one or more SPS occasions are reassigned to another UE 120). Accordingly, when the UE 120 monitors and decodes SPS occasions on all component carriers with SPS configured, even when the base 110 is using only a subset of the component carriers, power consumed by the UE 120 to monitor unused carriers is wasted. Furthermore, as a quantity of component carriers with SPS configured increases, the power that the UE 120 consumes monitoring and decoding potentially unused SPS occasions increases.

For example, FIG. 8B illustrates an example transmission timeline in which downlink SPS is configured on a first component carrier (CC 1) in FR2 and on a second component carrier (CC 0) in FR1. For example, as shown by reference number 850, the base station 110 may attempt to send a scheduled downlink transmission to the UE 120 via a PDSCH on the first component carrier in FR2, and the UE 120 may fail to receive the downlink transmission (e.g., due to atmospheric absorption, blocking caused by reliability issues, or for some other reason that affects link quality). In this case, as shown by reference number 852, the UE may use a PUCCH to send a negative acknowledgement (NACK) to the base station 110 on the first component carrier in FR2 to indicate that the downlink transmission was not received. Furthermore, as shown by reference number 854, an SPS occasion may be configured on the second component carrier in FR1, which is unused in the illustrated example. Nonetheless, as shown by reference number 856, the UE 120 may provide a NACK to the base station 110 to indicate that a PDSCH transmission was not detected during the unused SPS occasion. In some aspects, as described herein, the UE may start to monitor one or more other component carriers (e.g., other than the first component carrier on which the (failed) downlink transmission was originally scheduled) that the base station 110 may use to retransmit the failed downlink transmission.

As further shown in FIG. 8B, and by reference numbers 858 and 860, the UE 120 may transmit an SRS to the base station 110 to enable the base station 110 to determine channel quality on the first component carrier and the second component carrier. In this case, because the UE 120 provided the NACK to indicate that the UE 120 failed to receive the scheduled downlink transmission on the first component carrier, the UE 120 may start to monitor one or more component carriers other than the first component carrier, and the base station 110 may use the channel quality determined from the SRS transmissions to select one or more component carriers for rescheduling the failed downlink transmission on a different component carrier for improved reliability. For example, as shown by reference number 862, the base station 110 has rescheduled the failed downlink transmission on the second component carrier in FR1.

As further shown in FIG. 8B, and by reference numbers 864 and 866, an SPS occasion may be scheduled on each of the component carriers in a second cycle. In the example shown in FIG. 8B, as mentioned above, the UE 120 monitors the SPS occasions on each component carrier even though the base station 110 may only select a subset of the component carriers for a duplicated downlink transmission. Accordingly, the UE 120 may unnecessarily consume power monitoring and decoding the unused SPS occasion on the first component carrier, and this power impact on the UE 120 may increase as a quantity of component carriers with SPS configured increases. As described in further detail below, some techniques and apparatuses described herein may reduce power consumption at the UE 120 by monitoring SPS occasions on a subset of the component carriers with SPS configured.

As indicated above, FIGS. 8A-8B are provided as an example. Other examples may differ from what is described with regard to FIGS. 8A-8B.

Figure 9:
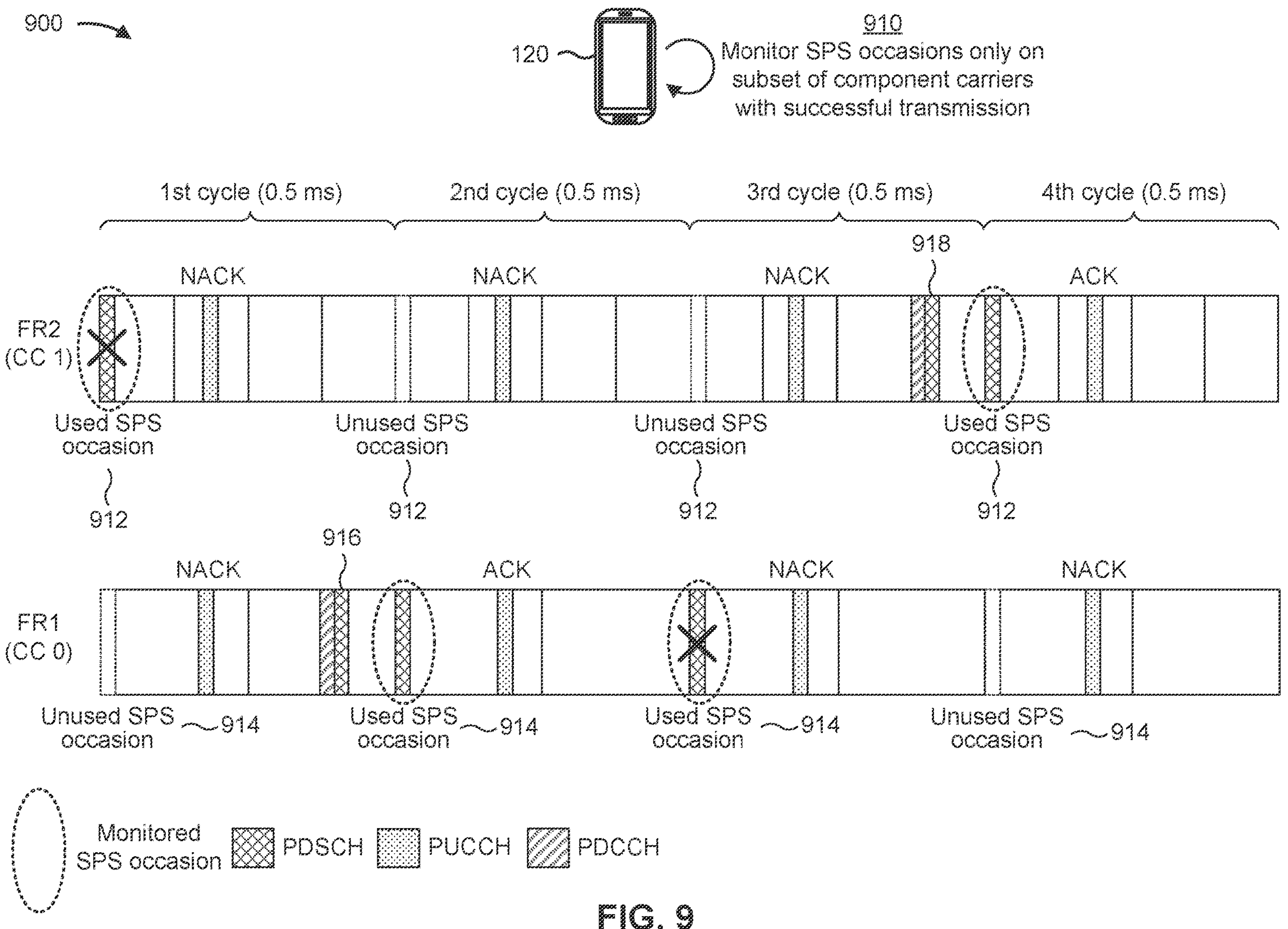
FIGS. 9-12 are diagrams illustrating an example of power efficient monitoring for SPS occasions on multiple component carriers, in accordance with various aspects of the present disclosure.

FIG. 9 is a diagram illustrating an example 900 of power efficient monitoring for SPS occasions on multiple component carriers, in accordance with various aspects of the present disclosure. As shown in FIG. 9, and by reference number 910, the UE 120 may save power, conserve processing resources, and/or the like by monitoring SPS occasions only on a subset of the component carriers that have a successful transmission (or retransmission), which the UE 120 may indicate to the base station 110 via an ACK message. For example, as shown in FIG. 9, and by reference number 912, the first component carrier in FR2 may be associated with a first SPS configuration in which an SPS occasion is scheduled in an initial portion (e.g., an initial symbol, an initial subframe, and/or the like) of each cycle. Furthermore, as shown in FIG. 9, and by reference number 914, the second component carrier in FR1 may be associated with a second SPS configuration in which an SPS occasion is scheduled in the initial portion of each cycle. In this way, the base station 110 may use the SPS occasions in the different component carriers to duplicate a downlink transmission for improved reliability, robustness, and/or the like.

As shown in FIG. 9, the UE 120 may initially monitor the SPS occasion on the first component carrier only during the first cycle. For example, as described in further detail elsewhere herein, the UE 120 may initially monitor the SPS occasion on the first component carrier only based on downlink control information (DCI) provided by the base station 110, based on a scheme in which the UE 120 always monitors SPS occasions on a primary component carrier and conditionally monitors SPS occasions on one or more secondary component carriers, based on a scheme in which the UE 120 switches between monitoring SPS occasions on a primary component carrier and SPS occasions on one or more secondary component carriers, and/or the like.

As further shown in FIG. 9, the base station 110 may attempt to use the SPS occasion on the first component carrier to send a PDSCH transmission, and the attempted transmission may fail to reach the UE 120. In some aspects, the UE 120 may transmit, to the base station 110, feedback that includes a NACK to indicate that the UE 120 failed to receive and/or successfully decode the attempted transmission. Furthermore, based at least in part on transmitting the NACK, the UE 120 may start to monitor one or more other component carriers that the base station 110 may use to retransmit the PDSCH transmission. Accordingly, as shown by reference number 916, the base station 110 may send a PDCCH transmission (e.g., including DCI) to reschedule the failed downlink transmission on the second component carrier based on the UE 120 providing the NACK to indicate that the initial downlink transmission was not received. As shown in FIG. 9, in the second cycle, the UE 120 monitors the SPS occasion on the second component carrier only, as the UE 120 successfully received the retransmission on the second component carrier in the first cycle. Furthermore, because the UE 120 did not receive a successful transmission from the base station 110 on the first component carrier in the first cycle, the UE 120 ceases to monitor the first component carrier for at least the next scheduled SPS occasion. For example, in some aspects, the first component carrier may be excluded from the subset of the component carriers that are monitored for scheduled SPS occasions for a defined quantity of reception occasions following the failed downlink transmission, where the defined quantity is generally an integer greater than or equal to one (1).

As further shown in FIG. 9, the UE 120 may receive a successful downlink transmission from the base station 110 during the SPS occasion on the second component carrier in the second cycle, which the UE 120 indicates to the base station 110 via feedback that includes an ACK message.

Accordingly, the UE 120 continues to monitor the second component carrier in the third cycle based on the successful transmission in the previous cycle, and the UE 120 does not monitor the first component carrier in the third cycle because the UE 120 did not receive a successful transmission on the first component carrier in the previous cycle.

However, in the third cycle, a downlink transmission that the base station 110 attempts during the SPS occasion on the second component carrier fails, and the failed downlink transmission is successfully rescheduled and retransmitted on the first component carrier, as shown by reference number 918. Accordingly, in the fourth cycle, the UE 120 monitors the SPS occasion on the first component carrier based on the successful retransmission in the third cycle, and the UE 120 does not monitor the scheduled SPS occasion on the second component carrier during the fourth cycle because the UE 120 did not receive a successful transmission on the second component carrier during the third cycle. In this way, during a current cycle, the UE 120 may monitor and decode SPS occasions only on a subset of component carriers that had a successful transmission in a previous cycle, which reduces power consumption and otherwise conserves resources at the UE 120 by avoiding monitoring unused SPS occasions. Additionally, or alternatively, in some aspects, the UE 120 may indicate a preference for the subset of component carriers to be monitored by the UE 120 when transmitting the feedback (e.g., ACK or NACK) to indicate whether a particular transmission succeeded or failed. For example, in a carrier aggregation scenario where the UE 120 has multiple component carriers activated, possibly in different frequency ranges, the UE 120 may indicate a preference to only monitor certain component carriers based on one or more internal criteria that may not necessarily relate to link quality. For example, the UE 120 may indicate a preference to only monitor component carriers in a lower frequency range in order to deactivate radio frequency (RF) components associated with a higher frequency range that consume more power. In another example, the ACK/NACK feedback transmitted by the UE 120 may indicate a preference to use one or more component carriers for measurements only, and may indicate a preference to receive downlink data transmissions on other component carriers. Accordingly, in some cases, the subset of component carriers that the UE 120 monitors in a given cycle may be determined based on an internal preference that the UE 120 indicates in ACK/NACK feedback that the UE 120 transmits to the base station 110.

As indicated above, FIG. 9 is provided as an example. Other examples may differ from what is described with regard to FIG. 9.

Figure 10:
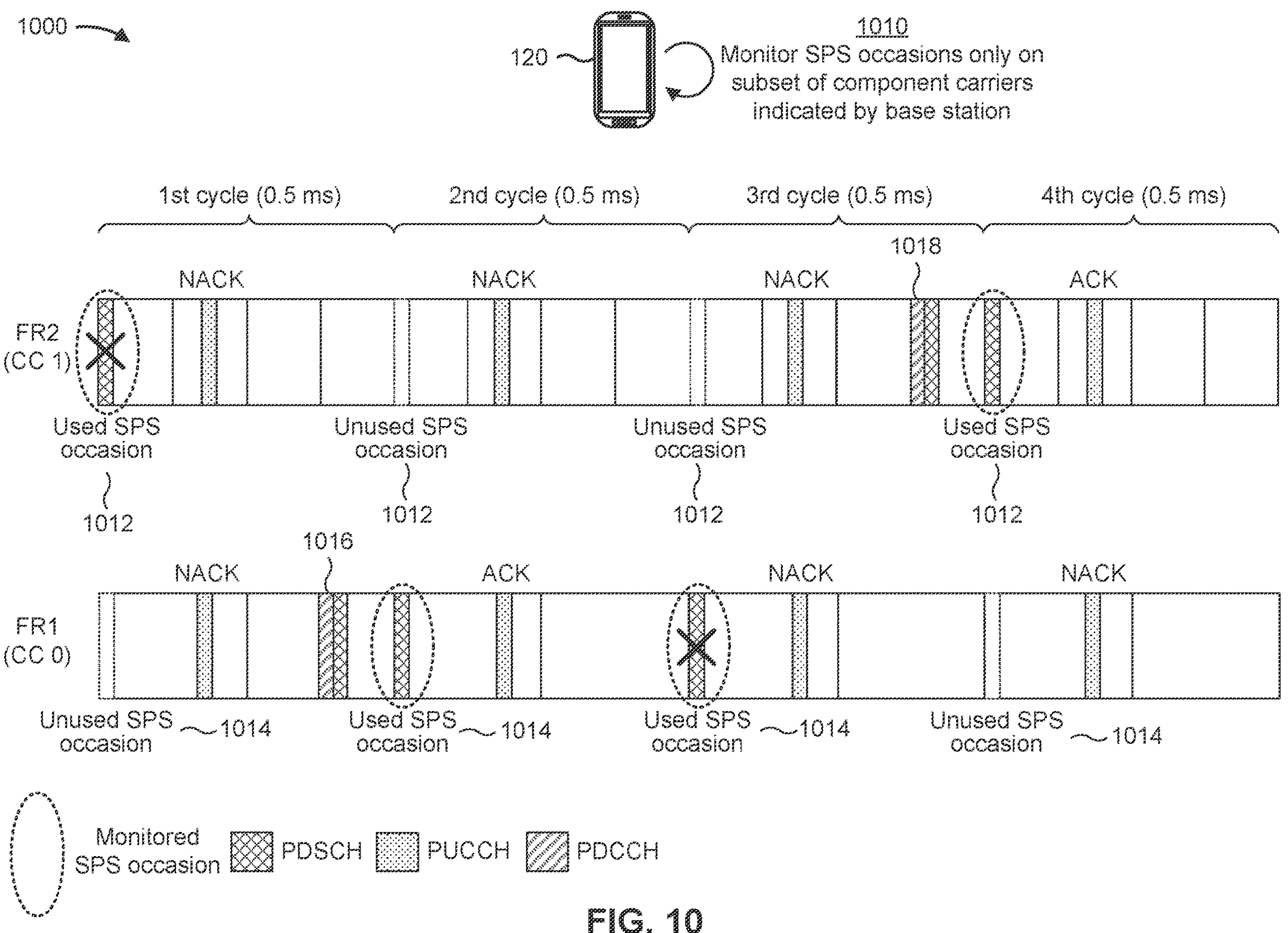

FIG. 10 is a diagram illustrating an example 1000 of power efficient monitoring for SPS occasions on multiple component carriers, in accordance with various aspects of the present disclosure. As shown in FIG. 10, and by reference number 1010, the UE 120 may save power, conserve processing resources, and/or the like by monitoring SPS occasions only on a subset of the component carriers based on one or more indications provided by the base station 110. For example, in some aspects, the base station 110 may explicitly indicate the subset of component carriers to be monitored in one or more DCI messages. Additionally, or alternatively, the subset of component carriers to be monitored may be implicitly indicated based on one or more DCI messages that are used to reschedule a failed transmission. Furthermore, in some aspects, the subset of component carriers that are indicated by the base station 110 may be determined according to a preference that the UE 120 indicates in ACK/NACK feedback that the UE 120 transmits to the base station 110 to indicate whether the UE 120 successfully received and/or decoded one or more downlink transmissions.

For example, as shown in FIG. 10, and by reference number 1012, the first component carrier in FR2 may be associated with a first SPS configuration in which an SPS occasion is scheduled in an initial portion of each cycle. Furthermore, as shown in FIG. 10, and by reference number 1014, the second component carrier in FR1 may be associated with a second SPS configuration in which an SPS occasion is scheduled in the initial portion of each cycle. In this way, the base station 110 may use the SPS occasions in the different component carriers to duplicate a downlink transmission for improved reliability, robustness, and/or the like. However, as mentioned elsewhere herein, the base station 110 may not use each scheduled SPS occasion (e.g., may select only a subset of the component carriers for transmission duplication).

As shown in FIG. 10, the UE 120 may initially monitor the SPS occasion on the first component carrier only during the first cycle. For example, in some aspects, the UE 120 may receive a DCI message from the base station 110 prior to the first cycle, which may explicitly indicate that the UE 120 is to initially monitor the first component carrier only. Additionally, or alternatively, the UE 120 may have received a previous DCI message to reschedule a failed transmission on the first component carrier. Additionally, or alternatively, the UE 120 may initially monitor the SPS occasion on the first component carrier only, based on a scheme in which the UE 120 always monitors SPS occasions on a primary component carrier and conditionally monitors SPS occasions on one or more secondary component carriers, based on a scheme in which the UE 120 switches between monitoring SPS occasions on a primary component carrier and SPS occasions on secondary component carriers, and/or the like.

As further shown in FIG. 10, and by reference number 1016, the base station 110 may reschedule a downlink transmission that has failed on the first component carrier on the second component carrier. Accordingly, the base station 110 may send a PDCCH transmission that includes a DCI message to reschedule the failed downlink transmission on the second component carrier, and the UE 120 may use the information contained in the DCI message to determine which component carrier(s) to monitor in a subsequent cycle. For example, as shown in FIG. 10, the UE 120 may monitor the SPS occasion on the second component carrier only in the second cycle, and the UE 120 may continue to monitor the SPS occasion on the second component carrier only until the UE 120 receives another DCI message from the base station 110 that explicitly or implicitly indicates which component carrier(s) the UE 120 is to monitor in subsequent cycles. For example, as shown, the base station 110 may attempt a downlink transmission during the SPS occasion on the second component carrier in the third cycle, and the attempted downlink transmission fails. As shown by reference number 1018, the base station 110 may send a DCI message rescheduling the failed downlink transmission on the first component carrier. Accordingly, in the fourth cycle, the UE 120 monitors the SPS occasion on the first component carrier based on the DCI message received in the previous cycle, and the UE 120 does not monitor the scheduled SPS occasion on the second component carrier during the fourth cycle based on the DCI message rescheduling the failed downlink transmission on another component carrier.

As indicated above, FIG. 10 is provided as an example. Other examples may differ from what is described with regard to FIG. 10.

Figure 11:
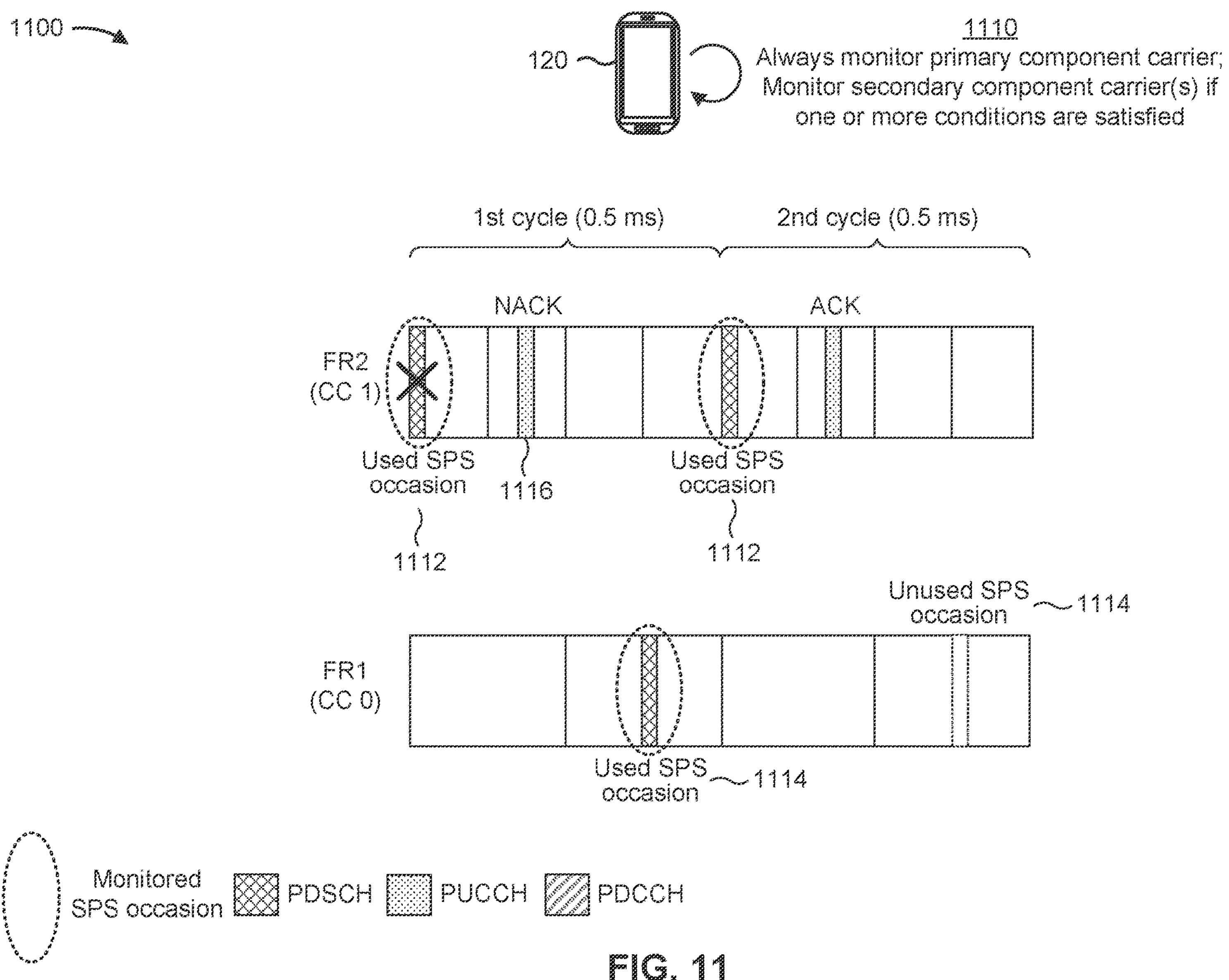

FIG. 11 is a diagram illustrating an example 1100 of power efficient monitoring for SPS occasions on multiple component carriers, in accordance with various aspects of the present disclosure. As shown in FIG. 11, and by reference number 1110, the UE 120 may save power, conserve processing resources, and/or the like by always monitoring SPS occasions on a primary component carrier and monitoring SPS occasions on one or more secondary component carriers only when one or more conditions are satisfied (e.g., when an attempted transmission on the primary component carrier fails). For example, as shown in FIG. 11, and by reference number 1112, the first component carrier in FR2 may be associated with a first SPS configuration in which an SPS occasion is scheduled in an initial portion of each cycle. Furthermore, as shown in FIG. 11, and by reference number 1114, the second component carrier in FR1 may be associated with a second SPS configuration in which an SPS occasion is scheduled in a later portion of each cycle (e.g., relative to the scheduled SPS occasion on the first component carrier). In this way, the base station 110 may use the SPS occasions on the second component carrier to retransmit downlink transmissions that fail on the first component carrier without having to first send a PDCCH message to reschedule the failed downlink transmission (e.g., via DCI).

As shown in FIG. 11, the first component carrier in FR2 may be configured as the primary component carrier (e.g., based on DCI provided by the base station 110). Accordingly, as shown in FIG. 11, the UE 120 may always monitor the SPS occasion on the first (primary) component carrier. Furthermore, as mentioned above, the one or more conditions for monitoring the secondary component carrier(s) may be satisfied when an attempted downlink transmission fails on the primary component carrier. For example, as shown by reference number 1116, the UE 120 may transmit, to the base station 110, feedback that includes a NACK message based on a failed downlink transmission during the scheduled SPS occasion on the primary component carrier in the first cycle. Additionally, or alternatively, as described above, the feedback transmitted to the base station 110 may indicate a preference for one or more secondary component carriers to be monitored based on the attempted downlink transmission failing on the primary component carrier. Furthermore, based at least in part on transmitting the NACK message, the UE 120 may start to monitor one or more other component carriers that the base station 110 may use to retransmit the scheduled SPS transmission. For example, the UE 120 may monitor the scheduled SPS occasion on the secondary component carrier(s) (including CC 0) in the first cycle based on the failed downlink transmission on the primary component carrier in the first cycle. However, in the second cycle, the UE 120 receives a successful downlink transmission during the scheduled SPS occasion. Accordingly, in the second cycle, the condition(s) for monitoring the secondary component carrier(s) are not satisfied, and the UE 120 therefore does not monitor the scheduled SPS occasion on the second component carrier in the second cycle.

As indicated above, FIG. 11 is provided as an example. Other examples may differ from what is described with regard to FIG. 11.

Figure 12:
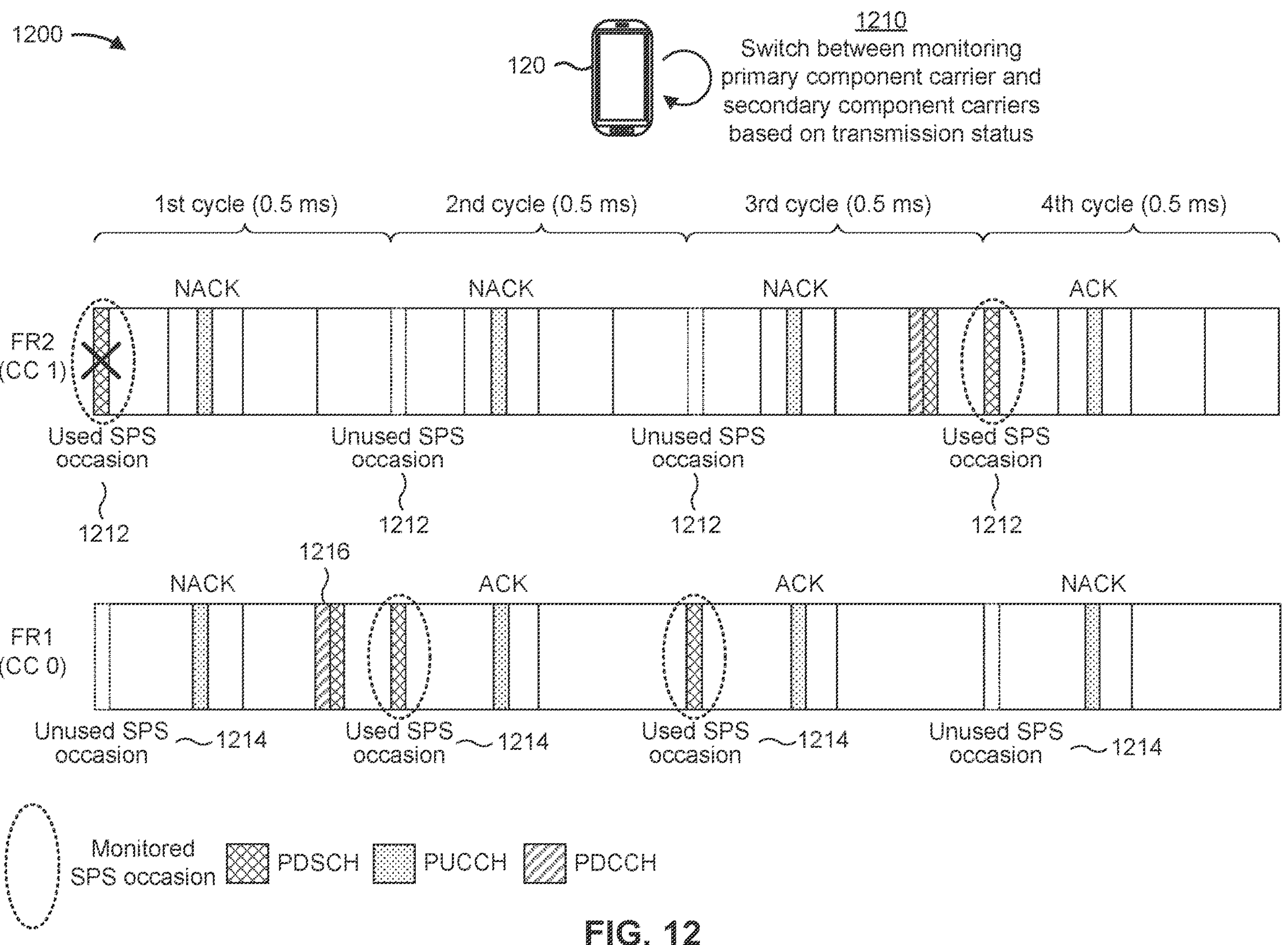

FIG. 12 is a diagram illustrating an example 1200 of power efficient monitoring for SPS occasions on multiple component carriers, in accordance with various aspects of the present disclosure. As shown in FIG. 12, and by reference number 1210, the UE 120 may save power, conserve processing resources, and/or the like by switching between monitoring SPS occasions on a primary component carrier and monitoring SPS occasions on one or more secondary component carriers based on a transmission status on the respective component carriers. For example, as shown in FIG. 12, and by reference number 1212, the first component carrier in FR2 may be associated with a first SPS configuration in which an SPS occasion is scheduled in an initial portion of each cycle. Furthermore, as shown in FIG. 12, and by reference number 1214, the second component carrier in FR1 may be associated with a second SPS configuration in which an SPS occasion is scheduled in the initial portion of each cycle, where the SPS occasions on the first component carrier and the second component carrier are aligned in time. In this way, the base station 120 may use the SPS occasions on the first and second component carriers to duplicate a downlink transmission to improve reliability, robustness, and/or the like.

As shown in FIG. 12, the first component carrier in FR2 may be configured as the primary component carrier (e.g., based on DCI provided by the base station 120). Accordingly, as shown in FIG. 12, the UE 120 may initially monitor the SPS occasion on the first (primary) component carrier. However, when an attempted downlink transmission fails on the primary component carrier, the UE 120 may subsequently switch to monitoring one or more secondary component carriers on which a successful retransmission occurs. Additionally, or alternatively, when transmitting feedback to indicate that the attempted downlink transmission failed on the primary component carrier, the UE 120 may indicate a preference for the one or more secondary component carriers to be monitored for the retransmission. In some aspects, the UE 120 may subsequently continue to monitor the secondary component carrier(s) on which the successful retransmission occurred for a defined quantity of cycles, which may be an integer value greater than or equal to one (1), and the UE 120 may then switch back to monitoring the primary component carrier only after the defined quantity of cycles have elapsed. For example, as shown by reference number 1216, the base station 110 may use the second component carrier (CC 0) to perform a successful retransmission of an attempted downlink transmission that failed during the scheduled SPS occasion on the primary component carrier in the first cycle. Accordingly, in a second cycle, the UE 120 may switch from monitoring the primary component carrier (CC 1) to monitoring the secondary component carrier (CC 0) on which the successful retransmission occurred. Furthermore, in an example where the defined quantity of cycles is 1, the UE 120 may continue to monitor the secondary component carrier during the third cycle before switching back to monitoring the primary component carrier in the fourth cycle. For example, if the defined quantity of cycles were to have a value of 2, the UE 120 would continue to monitor the secondary component carrier during the third cycle and the fourth cycle before switching back to monitoring the primary component carrier in the fifth cycle, and/or the like.

As indicated above, FIG. 12 is provided as an example. Other examples may differ from what is described with regard to FIG. 12.

Figure 13:
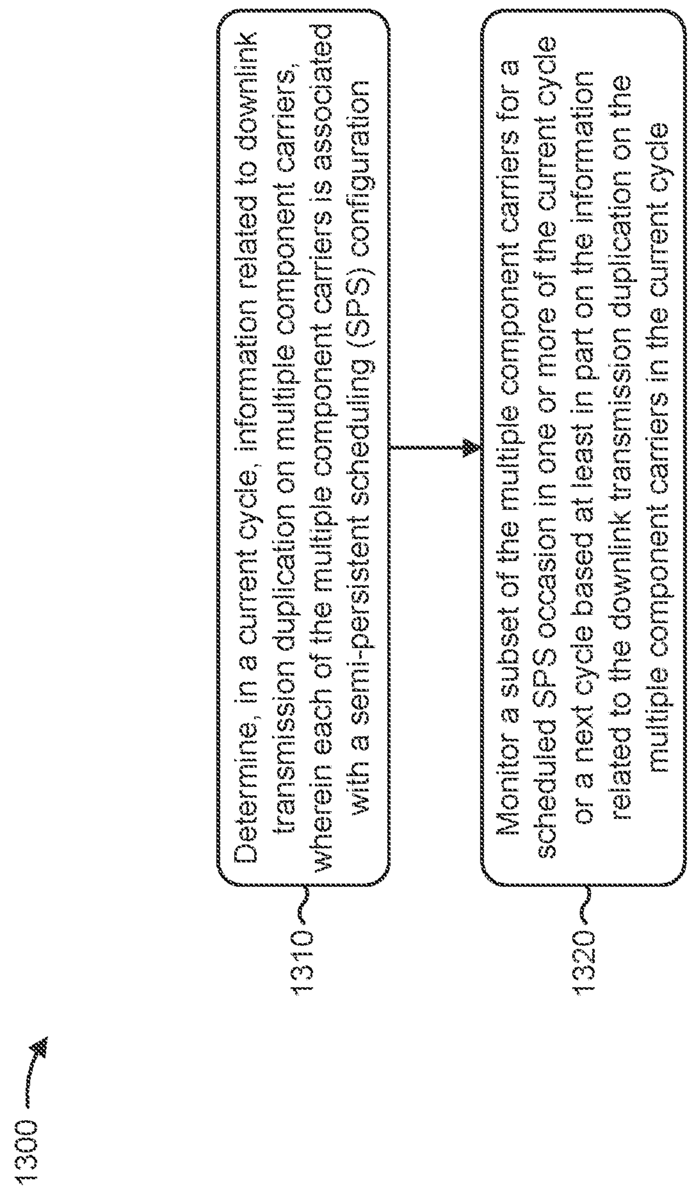
FIG. 13 is a diagram illustrating an example process performed, for example, by a user equipment, in accordance with various aspects of the present disclosure.

FIG. 13 is a diagram illustrating an example process 1300 performed, for example, by a UE, in accordance with various aspects of the present disclosure. Example process 1300 is an example where a UE (e.g., UE 120 and/or the like) performs operations associated with power efficient monitoring for SPS occasions on multiple component carriers.

As shown in FIG. 13, in some aspects, process 1300 may include determining, in a current cycle, information related to downlink transmission duplication on multiple component carriers, wherein each of the multiple component carriers is associated with an SPS configuration (block 1310). For example, the UE (e.g., using receive processor 258, transmit processor 264, controller/processor 280, memory 282, and/or the like) may determine, in a current cycle, information related to downlink transmission duplication on multiple component carriers, as described above. In some aspects, each of the multiple component carriers is associated with an SPS configuration.

As further shown in FIG. 13, in some aspects, process 1300 may include monitoring a subset of the multiple component carriers for a scheduled SPS occasion in one or more of the current cycle or a next cycle based at least in part on the information related to the downlink transmission duplication on the multiple component carriers in the current cycle (block 1320). For example, the UE (e.g., using receive processor 258, transmit processor 264, controller/processor 280, memory 282, and/or the like) may monitor a subset of the multiple component carriers for a scheduled SPS occasion in one or more of the current cycle or a next cycle based at least in part on the information related to the downlink transmission duplication on the multiple component carriers in the current cycle, as described above.

Process 1300 may include additional aspects, such as any single aspect or any combination of aspects described below and/or in connection with one or more other processes described elsewhere herein.

In a first aspect, the information related to the downlink transmission duplication indicates whether a downlink transmission succeeded in the current cycle with respect to each of the multiple component carriers.

In a second aspect, alone or in combination with the first aspect, the subset of the multiple component carriers includes only one or more of the multiple component carriers on which the downlink transmission succeeded in the current cycle.

In a third aspect, alone or in combination with one or more of the first and second aspects, the UE may start to monitor the subset of the multiple component carriers based at least in part on the information related to the downlink transmission duplication indicating that the downlink transmission failed in the current cycle with respect to one or more of the multiple component carriers, and the subset of the multiple component carriers excludes the one or more of the multiple component carriers on which the downlink transmission failed in the current cycle.

In a fourth aspect, alone or in combination with one or more of the first through third aspects, the one or more of the multiple component carriers on which the downlink transmission failed in the current cycle are excluded from the subset of the multiple component carriers monitored for the scheduled SPS occasion for a predefined quantity of reception occasions following the failed downlink transmission.

In a fifth aspect, alone or in combination with one or more of the first through fourth aspects, the UE may transmit, to a base station, feedback that indicates whether the downlink transmission succeeded in the current cycle with respect to each of the multiple component carriers, and the feedback further indicates a preference for the subset of the multiple component carriers to be monitored for the scheduled SPS occasion in one or more of the current cycle or a next cycle.

In a fifth aspect, alone or in combination with one or more of the first through fourth aspects, the information related to the downlink transmission duplication includes DCI received from a base station in the current cycle.

In a sixth aspect, alone or in combination with one or more of the first through fifth aspects, the subset of the multiple component carriers includes only one or more of the multiple component carriers that are explicitly indicated in the DCI received from the base station.

In a seventh aspect, alone or in combination with one or more of the first through sixth aspects, the UE may identify the subset of the multiple component carriers to be monitored for the scheduled SPS occasion based at least in part on the DCI received from the base station rescheduling a failed downlink transmission on the subset of the multiple component carriers, and the subset of the multiple component carriers to be monitored for the scheduled SPS occasion excludes one or more of the multiple component carriers associated with the failed downlink transmission.

In an eighth aspect, alone or in combination with one or more of the first through seventh aspects, the UE may identify a primary component carrier among the multiple component carriers associated with the SPS configuration, and the subset of the multiple component carriers to be monitored for the scheduled SPS occasion includes at least the primary component carrier.

In a ninth aspect, alone or in combination with one or more of the first through eighth aspects, the subset of the multiple component carriers to be monitored for the scheduled SPS occasion further includes one or more secondary component carriers, based at least in part on the information related to the downlink transmission duplication on the multiple component carriers in the current cycle satisfying one or more conditions.

In a tenth aspect, alone or in combination with one or more of the first through ninth aspects, the one or more conditions are satisfied based at least in part on a failure of a downlink transmission on the primary component carrier.

In an eleventh aspect, alone or in combination with one or more of the first through tenth aspects, the UE may identify a primary component carrier and one or more secondary component carriers among the multiple component carriers associated with the SPS configuration, and the subset of the multiple component carriers to be monitored for the scheduled SPS occasion includes either the primary component carrier or the one or more secondary component carriers.

In a twelfth aspect, alone or in combination with one or more of the first through eleventh aspects, the subset of the multiple component carriers to be monitored for the scheduled SPS occasion includes the primary component carrier and excludes the one or more secondary component carriers based at least in part on a successful downlink transmission on the primary component carrier in the current cycle.

In a thirteenth aspect, alone or in combination with one or more of the first through twelfth aspects, the subset of the multiple component carriers to be monitored for the scheduled SPS occasion includes the one or more secondary component carriers and excludes the primary component carrier based at least in part on a failure of a downlink transmission on the primary component carrier in the current cycle.

In a fourteenth aspect, alone or in combination with one or more of the first through thirteenth aspects, the subset of the multiple component carriers to be monitored for the scheduled SPS occasion includes the one or more secondary component carriers and excludes the primary component carrier for a predefined quantity of cycles.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

determining, in a current cycle, a particular component carrier of multiple component carriers, each associated with a semi-persistent scheduling (SPS) configuration, based at least in part on a success of a particular downlink transmission on the particular component carrier of the multiple component carriers in the current cycle; and monitoring only the particular component carrier of the multiple component carriers for a scheduled SPS occasion in one or more of the current cycle or a next cycle based at least in part on determining the particular component carrier of the multiple component carriers.

2. The method of claim 1, wherein the particular component carrier of the multiple component carriers is further determined based at least in part on a failure of a second downlink transmission on a second component carrier of the multiple component carriers in the current cycle.

3. The method of claim 1, wherein the particular component carrier of the multiple component carriers is exclusively monitored for the scheduled SPS occasion for a predefined quantity of reception occasions following the particular downlink transmission.

4. The method of claim 1, further comprising transmitting, to a network node, feedback that indicates that the particular downlink transmission succeeded in the current cycle with respect to each of the multiple component carriers, wherein the feedback further indicates a preference for the particular component carrier of the multiple component carriers to be monitored for the scheduled SPS occasion in the one or more of the current cycle or the next cycle.

5. The method of claim 1, further comprising monitoring a second component carrier of the multiple component carriers based at least in part on an indication provided by a network node via a downlink control information (DCI) in the current cycle, wherein the particular component carrier of the multiple component carriers is further determined based at least in part on monitoring the second component carrier of the multiple component carriers.

6. The method of claim 5, wherein the DCI explicitly indicates that the UE is to monitor the second component carrier of the multiple component carriers.

7. The method of claim 1, further comprising identifying the particular component carrier of the multiple component carriers to be monitored for the scheduled SPS occasion based at least in part on a downlink control information (DCI), received from a network node, rescheduling a previous downlink transmission when the previous downlink transmission failed on a second component carrier of the multiple component carriers.

8. The method of claim 1, further comprising monitoring a primary component carrier of the multiple component carriers, wherein the particular component carrier of the multiple component carriers is further determined based at least in part on monitoring the primary component carrier of the multiple component carriers.

9. The method of claim 8, wherein the particular component carrier of the multiple component carriers is further determined based at least in part on a failure of a previous downlink transmission on the primary component carrier of the multiple component carriers.

10. The method of claim 1, further comprising identifying a primary component carrier and a secondary component carrier that are each of the multiple component carriers, wherein the particular component carrier of the multiple component carriers is either the primary component carrier or the secondary component carrier.

11. The method of claim 10, wherein the particular component carrier of the multiple component carriers is the primary component carrier based at least in part on the success of the particular downlink transmission on the primary component carrier of the multiple component carriers in the current cycle.

12. The method of claim 10, wherein the particular component carrier of the multiple component carriers to be monitored for the scheduled SPS occasion is the secondary component carrier for a predefined quantity of cycles based at least in part on a failure of a previous downlink transmission on the primary component carrier of the multiple component carriers in the current cycle.

13. A user equipment (UE) for wireless communication, comprising:

one or more memories; and one or more processors coupled to the one or more memories, the one or more processors configured to:

determine, in a current cycle a particular component carrier of multiple component carriers, each associated with a semi-persistent scheduling (SPS) configuration, based at least in part on a success of a particular downlink transmission on the particular component carrier of the multiple component carriers in the current cycle; and monitor only the particular component carrier of the multiple component carriers for a scheduled SPS occasion in one or more of the current cycle or a next cycle based at least in part on determining the particular component carrier of the multiple component carriers.

14. The UE of claim 13, wherein the particular component carrier of the multiple component carriers is further determined based at least in part on a failure of a second downlink transmission on a second component carrier of the multiple component carriers in the current cycle.

15. The UE of claim 13, wherein the particular component carrier of the multiple component carriers is exclusively monitored for the scheduled SPS occasion for a predefined quantity of reception occasions following the particular downlink transmission.

16. The UE of claim 13, wherein the one or more processors are further configured to transmit, to a network node, feedback that indicates that the particular downlink transmission succeeded in the current cycle with respect to each of the multiple component carriers, wherein the feedback further indicates a preference for the particular component carrier of the multiple component carriers to be monitored for the scheduled SPS occasion in the one or more of the current cycle or the next cycle.

17. The UE of claim 13, further comprising monitoring a second component carrier of the multiple component carriers based at least in part on an indication provided by a network node via a downlink control information (DCI), wherein the particular component carrier of the multiple component carriers is further determined based at least in part on monitoring the second component carrier of the multiple component carriers.

18. The UE of claim 17, wherein the DCI explicitly indicates that the UE is to monitor the second component carrier of the multiple component carriers.

19. The UE of claim 13, wherein the one or more processors are further configured to identify the particular component carrier of the multiple component carriers to be monitored for the scheduled SPS occasion based at least in part on a downlink control information (DCI), received from a network node, rescheduling a previous downlink transmission when the previous downlink transmission failed on a second component carrier of the multiple component carriers.

20. The UE of claim 13, wherein the one or more processors are further configured to monitor a primary component carrier of the multiple component carriers, wherein the particular component carrier of the multiple component carriers is further determined based at least in part on monitoring the primary component carrier of the multiple component carriers.

21. The UE of claim 20, wherein the particular component carrier of the multiple component carriers is further determined based at least in part on a failure of a previous downlink transmission on the primary component carrier of the multiple component carriers.

22. The UE of claim 13, wherein the one or more processors are further configured to identify a primary component carrier and a secondary component carrier that are each of the multiple component carriers, wherein the particular component carrier of the multiple component carriers is either the primary component carrier or the secondary component carrier.

23. The UE of claim 22, wherein the particular component carrier of the multiple component carriers is the primary component carrier based at least in part on the success of the particular downlink transmission on the primary component carrier of the multiple component carriers in the current cycle.

24. The UE of claim 22, wherein the particular component carrier of the multiple component carriers is the secondary component carrier for a predefined quantity of cycles based at least in part on a failure of a previous downlink transmission on the primary component carrier of the multiple component carriers in the current cycle.

25. A non-transitory computer-readable medium storing one or more instructions for wireless communication, the one or more instructions comprising:

one or more instructions that, when executed by one or more processors of a user equipment, cause the one or more processors to:

determine, in a current cycle a particular component carrier of multiple component carriers, each associated with a semi-persistent scheduling (SPS) configuration, based at least in part on a success of a downlink transmission on the particular component carrier of the multiple component carriers in the current cycle; and monitor only the particular component carrier of the multiple component carriers for a scheduled SPS occasion in one or more of the current cycle or a next cycle based at least in part on determining the particular component carrier of the multiple component carriers.

26. An apparatus for wireless communication, comprising:

means for determining, in a current cycle, a particular component carrier of multiple component carriers, each associated with a semi-persistent scheduling (SPS)

configuration, based at least in part on a success of a downlink transmission on the particular component carrier of the multiple component carriers in the current cycle; and means for monitoring only the particular component carrier of the multiple component carriers for a scheduled SPS occasion in one or more of the current cycle or a next cycle based at least in part on determining the particular component carrier of the multiple component carriers.

27. The method of claim 1, wherein the particular component carrier of the multiple component carriers is monitored for the scheduled SPS occasion in the next cycle.

28. The UE of claim 13, wherein the particular component carrier of the multiple component carriers is monitored for the scheduled SPS occasion in the next cycle.

29. The non-transitory computer-readable medium of claim 25, wherein the particular component carrier of the multiple component carriers is monitored for the scheduled SPS occasion in the next cycle.

30. The apparatus of claim 26, wherein the particular component carrier of the multiple component carriers is monitored for the scheduled SPS occasion in the next cycle.

* * * * *